(12) United States Patent
Huang et al.

(10) Patent No.: US 12,307,187 B2
(45) Date of Patent: May 20, 2025

(54) CIRCUIT DESIGN HAVING AN IMPROVED CLOCK TREE

(71) Applicant: Synopsys, Inc., Mountain View, CA (US)

(72) Inventors: Tao Huang, San Jose, CA (US); Tao Lin, Palo Alto, CA (US); Min Pan, Fremont, CA (US); Zuo Dai, San Jose, CA (US); Jaehan Jeon, Santa Clara, CA (US)

(73) Assignee: Synopsys, Inc., Sunnyvale, CA (US)

( * ) Notice: Subject to any disclaimer, the term of this patent is extended or adjusted under 35 U.S.C. 154(b) by 606 days.

(21) Appl. No.: 17/747,797

(22) Filed: May 18, 2022

(65) Prior Publication Data

US 2023/0376670 A1 Nov. 23, 2023

(51) Int. Cl.
*G06F 30/396* (2020.01)
*G06F 30/3312* (2020.01)
*G06F 30/3315* (2020.01)
*G06F 30/367* (2020.01)
*G06F 30/373* (2020.01)
*G06F 30/398* (2020.01)

(52) U.S. Cl.
CPC ........ *G06F 30/396* (2020.01); *G06F 30/3312* (2020.01); *G06F 30/3315* (2020.01); *G06F 30/367* (2020.01); *G06F 30/373* (2020.01); *G06F 30/398* (2020.01)

(58) Field of Classification Search
CPC .... G06F 30/396; G06F 30/398; G06F 30/367; G06F 30/373; G06F 30/3312; G06F 30/3315

USPC .................. 716/108, 114, 134, 136; 703/16
See application file for complete search history.

(56) References Cited

U.S. PATENT DOCUMENTS

| | | | | |
|---|---|---|---|---|
| 6,559,701 B1 * | 5/2003 | Dillon | ...................... | G06F 1/10 327/293 |
| 7,051,312 B1 * | 5/2006 | Rahut | ..................... | G06F 30/39 716/113 |
| 7,296,246 B1 * | 11/2007 | Kuehlmann | .......... | G06F 30/396 716/108 |
| 7,472,365 B1 * | 12/2008 | Manaker, Jr. | ....... | G06F 30/3312 716/113 |
| 7,475,297 B1 * | 1/2009 | Manaker, Jr. | ......... | G06F 30/396 716/113 |

(Continued)

FOREIGN PATENT DOCUMENTS

| | | | | |
|---|---|---|---|---|
| JP | H0963292 A | * | 3/1997 | ............. G11C 19/00 |
| JP | 2006344222 A | * | 12/2006 | ............... G06F 1/10 |

(Continued)

*Primary Examiner* — Phallaka Kik
(74) *Attorney, Agent, or Firm* — Patterson + Sheridan, LLP

(57) ABSTRACT

A system and method updates a clock tree based on skew values of the circuit design. The clock tree is updated by obtaining a circuit design that includes circuit elements and a clock tree. The clock tree includes clock sources and clock sinks. Data path slack values for the clock tree are determined based on the clock sources and the clock sinks. Further, clock arrival values for the clock tree are determined based on the clock sources and the clock sinks. A first total local skew value of the circuit design is determined based on the data path slack values, and the clock arrival values, and updating the clock tree based on the first total local skew value.

20 Claims, 7 Drawing Sheets

(56) References Cited

U.S. PATENT DOCUMENTS

| | | | | |
|---|---|---|---|---|
| 8,205,182 | B1* | 6/2012 | Zlatanovici | G06F 30/327 |
| | | | | 716/113 |
| 8,635,579 | B1* | 1/2014 | Cao | G06F 30/396 |
| | | | | 716/108 |
| 10,467,365 | B1* | 11/2019 | Kulshreshtha | G06F 30/396 |
| 10,551,869 | B2* | 2/2020 | Vrudhula | G06F 1/10 |
| 10,755,009 | B1* | 8/2020 | Bradley | G06F 30/3312 |
| 10,860,757 | B1* | 12/2020 | Li | G06F 30/30 |
| 10,963,618 | B1* | 3/2021 | Farshidi | G06F 30/396 |
| 11,144,698 | B1* | 10/2021 | Garg | G06F 30/392 |
| 11,321,514 | B1* | 5/2022 | Meyer | G06F 30/396 |
| 11,347,916 | B1* | 5/2022 | Desai | G06N 3/063 |
| 11,520,959 | B1* | 12/2022 | Ding | G06F 30/39 |
| 2003/0061589 | A1* | 3/2003 | Nsame | G06F 30/39 |
| | | | | 716/113 |
| 2005/0132313 | A1* | 6/2005 | Lindkvist | G06F 30/30 |
| | | | | 716/114 |
| 2006/0064658 | A1* | 3/2006 | Minonne | G06F 30/327 |
| | | | | 716/108 |
| 2006/0288320 | A1* | 12/2006 | Murgai | G06F 1/10 |
| | | | | 716/134 |
| 2007/0288875 | A1* | 12/2007 | Eakins | G06F 30/396 |
| | | | | 716/139 |
| 2008/0216043 | A1* | 9/2008 | Hutzl | G06F 30/396 |
| | | | | 716/104 |
| 2010/0031214 | A1* | 2/2010 | Hou | G06F 30/392 |
| | | | | 716/119 |
| 2012/0047477 | A1* | 2/2012 | Kalafala | G06F 30/3312 |
| | | | | 716/108 |
| 2012/0240091 | A1* | 9/2012 | Sunder | G06T 11/206 |
| | | | | 716/113 |
| 2014/0047402 | A1* | 2/2014 | Terayama | G06F 30/327 |
| | | | | 716/108 |
| 2015/0213186 | A1* | 7/2015 | Le Bars | G06F 30/3315 |
| | | | | 716/114 |
| 2016/0117434 | A1* | 4/2016 | Millar | G06F 30/398 |
| | | | | 716/114 |
| 2016/0118966 | A1* | 4/2016 | Chowdhury | G06F 1/10 |
| | | | | 327/161 |
| 2018/0314771 | A1* | 11/2018 | Lee | G06F 30/392 |
| 2020/0117230 | A1* | 4/2020 | Ringe | G06F 30/367 |
| 2022/0050492 | A1* | 2/2022 | Teman | G06F 1/10 |
| 2022/0149848 | A1* | 5/2022 | Chou | H03L 7/091 |
| 2023/0037826 | A1* | 2/2023 | Lee | G06F 30/398 |

FOREIGN PATENT DOCUMENTS

| | | | | |
|---|---|---|---|---|
| JP | | 2008152550 A | * 7/2008 | |
| JP | | 2014035667 A | * 2/2014 | G06F 17/5068 |
| WO | WO-03052643 A1 | | * 6/2003 | G06F 1/10 |

* cited by examiner

CIRCUIT DESIGN HAVING AN IMPROVED CLOCK TREE

TECHNICAL FIELD

The present disclosure relates to the circuit design process, and, in more particular, to improving the performance of a circuit design by mitigating the negative effects of skew.

BACKGROUND

In the circuit design process, various timings are determined and analyzed to improve the performance of the circuit design. The timings may be used to determine skew within the circuit design. In a circuit design, a signal is received by different components of the circuit design at different times. For example, a signal may be received by a first component before that signal is received by a second component. The difference between when a first component receives the signal and when the second component receives the signal is skew. In some instances, skew can be harmful to the performance of a circuit design. In other instances, skew may be beneficial to the performance of a circuit design. During the circuit design process, a circuit design is analyzed to improve the performance of the circuit design by mitigating harmful skew and/or increasing beneficial skew.

SUMMARY

In one example, a method comprises obtaining a circuit design that includes circuit elements and a clock tree. The clock tree includes clock sources and clock sinks. The method includes determining data path slack values for the clock tree based on the clock sources and the clock sinks. Further, the method includes determining clock arrival values for the clock tree based on the clock sources and the clock sinks. The method further includes determining a first total local skew value of the circuit design based on the data path slack values, and the clock arrival values, and updating the clock tree based on the first total local skew value.

In one example, a system includes a memory storing instructions, and a processor. The process is coupled with the memory and executes the instructions. The instructions when executed cause the processor to obtain a circuit design that includes circuit elements and a clock tree. The clock tree includes clock sources and clock sinks. Further, the processor is caused to determine data path slack values for the clock tree based on the clock sources and the clock sinks. The processor is further caused to determine clock arrival values for the clock tree based on the clock sources and the clock sinks. Further, the processor is caused to determine a first total local skew value of the circuit design based on the data path slack values, and the clock arrival values, and update the clock tree based on the first total local skew value.

In one example, a non-transitory computer readable medium comprising stored instructions, which when executed by a processor, cause the processor to obtain a circuit design including circuit elements and a clock tree. The clock tree includes clock sources and clock sinks. The processor is caused to determine data path slack values for the clock tree based on the clock sources and the clock sinks, and determine clock arrival values for the clock tree based on the clock sources and the clock sinks. Further, the processor is caused to update the clock tree by adjusting timings within the clock tree based on the data path slack values and the clock arrival values.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
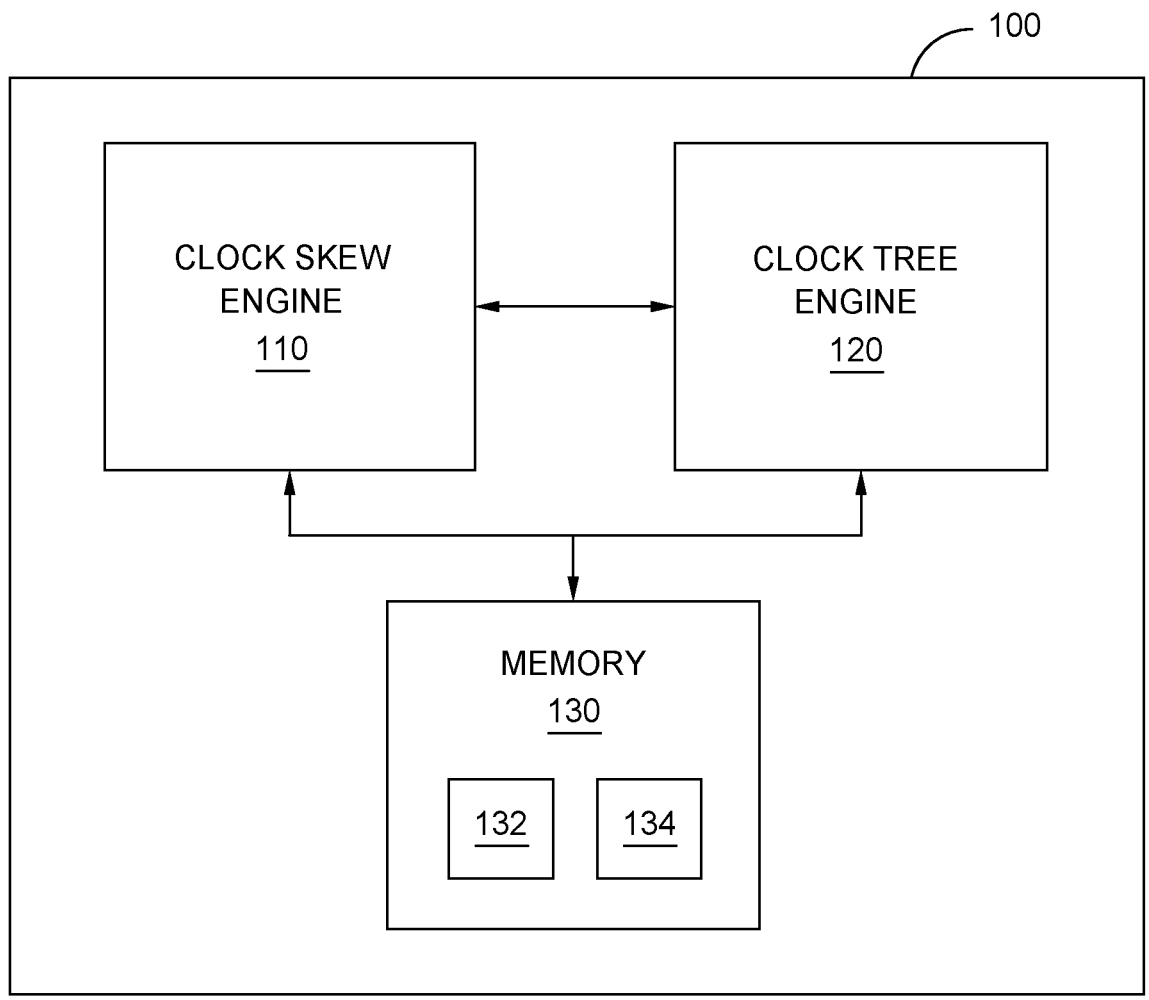
FIG. 1 illustrates a block diagram of a circuit design system, according to one or more examples.

Aspects of the present disclosure relate to a circuit design with an improved clock tree. In the design of integrated circuits (ICs), clock tree synthesis is used. Typically, clock tree synthesis mitigates global skew within a circuit (IC) design. In a circuit design the same sourced clock may arrive at different components within the circuit design at different times due to delays within the circuit design. The difference in arrival time between the different components is referred to as skew (e.g., clock skew). Skew may be local skew or global skew. Local skew corresponds to the difference in arrival time of a clock signal at related circuit elements (e.g., related flipflops) of a circuit design. Global skew is the difference in the arrival time of a clock signal at unrelated circuit elements of a circuit design. In one example, the global skew is the difference between the shortest clock path delay and the longest clock path delay reaching two sequential elements of a circuit design. Skew may be a positive or negative value.

Excessive skew may result in violations within the circuit design. Skew that results in violations may be referred to as harmful skew. A hold violation may occur between two elements of a circuit design driven by the same clock signal. In a hold violation, the clock signal is received by the first element, and the output of the first element is received by the second element before the clock signal is received by the second element. In a hold violation, the previous data is not held long at enough by the second element to be clocked through the circuit design. A setup violation may occur when data received by a circuit element of the circuit design was not set up and stabilized before a next clock pulse of the clock signal is received by the circuit element.

In some examples, skew may be beneficial to the performance of a circuit design. Such skew is referred to as beneficial skew. Beneficial skew benefits a circuit design by decreasing the clock period locally at which a circuit design operates correctly. In one example, positive clock skew may be used to mitigate setup violations, but can cause hold violations. Negative skew may be used to mitigate hold violations, but can cause setup violations.

Typically when determining local skew, only circuit elements that interact with each other, or are close to each other are considered. The circuit elements are clock sinks within a circuit design. Accordingly, when mitigating local skew within a circuit design, the power, performance, and area (PPA) of the circuit design may be negatively affected as beneficial skew may be reduced. Further, in some instances, the amount of harmful skew that is mitigated is not enough to improve performance of the circuit design. Further, due to the large number of local skew pairs (e.g., connected circuit elements within a circuit design) within a circuit design, typical skew mitigation techniques use heuristics that provide a less than optimal skew mitigation solution for a circuit design.

In the following, an improved skew mitigation process is described that mitigates skew of a circuit design without reducing the performance, power and area (PPA) of the circuit design. The skew mitigation process as described herein mitigates local skew of a circuit design by incorporating a timing view of a circuit design. The skew mitigation process as described herein more efficiently determines the amount of skew within a circuit design and mitigates the skew as compared to typical skew mitigation processes. Accordingly, the skew mitigation process as described herein, can be used to generate a circuit design with improved performance as compared to typical skew mitigation processes, and requires less processing resources and/or processing time as compared to typical skew mitigation processes. Accordingly, the manufacturing cost and/or time associated with the described skew mitigation process is less than that of typical skew mitigation processes.

FIG. 1 illustrates a circuit design system 100, according to one or more examples. The circuit design system 100 is used during the design a circuit design. In one particular example, the circuit design system 100 is used in the design of a clock tree for a circuit design. Further, the circuit design system 100 is used to mitigate skew within the circuit design to improve the performance of the circuit design. The circuit design system 100 includes one or more processors (e.g., the processing device 802 of FIG. 8) that execute instructions (e.g., the instructions 826 of FIG. 8) stored in a memory (e.g., the main memory 804 and/or the machine-readable medium 824 of FIG. 8) to analyze a circuit design to mitigate skew within the circuit design and update the clock tree or clock trees of a circuit design (e.g., the circuit design 132) of an IC device based on the mitigated skew.

The circuit design system 100 of FIG. 1 includes a clock skew engine 110, a clock tree engine 120, and a memory 130. The clock skew engine 110 includes one or more processors (e.g., the processing device 802 of FIG. 8) that execute instructions (e.g., the instructions 826 of FIG. 8) stored in a memory (e.g., the memory 130, the main memory 804 and/or the machine-readable medium 824 of FIG. 8). The clock skew engine 110 determines a total design local clock skew for the circuit design 132. Local clock skew is determined between two clock sinks of a clock tree of the circuit design 132. Local clock skew corresponds to a difference in arrival times of a clock signal between clock sinks of the circuit design 132.

The circuit design 132 includes one or more clock trees and logic circuitry. In one example, the circuit design 132 includes two or more clock trees. Each clock tree includes one or more clock sources and one or more clock sinks. A clock source is a pin within a clock tree that is associated with a clock signal input. A clock sink is a clock endpoint. In one example, each clock tree includes two or more clock sources and two or more clock sinks. Each clock sink is connected to one of the clock sources. In one example, two or more clock sinks are connected to the same clock source.

Figure 8:
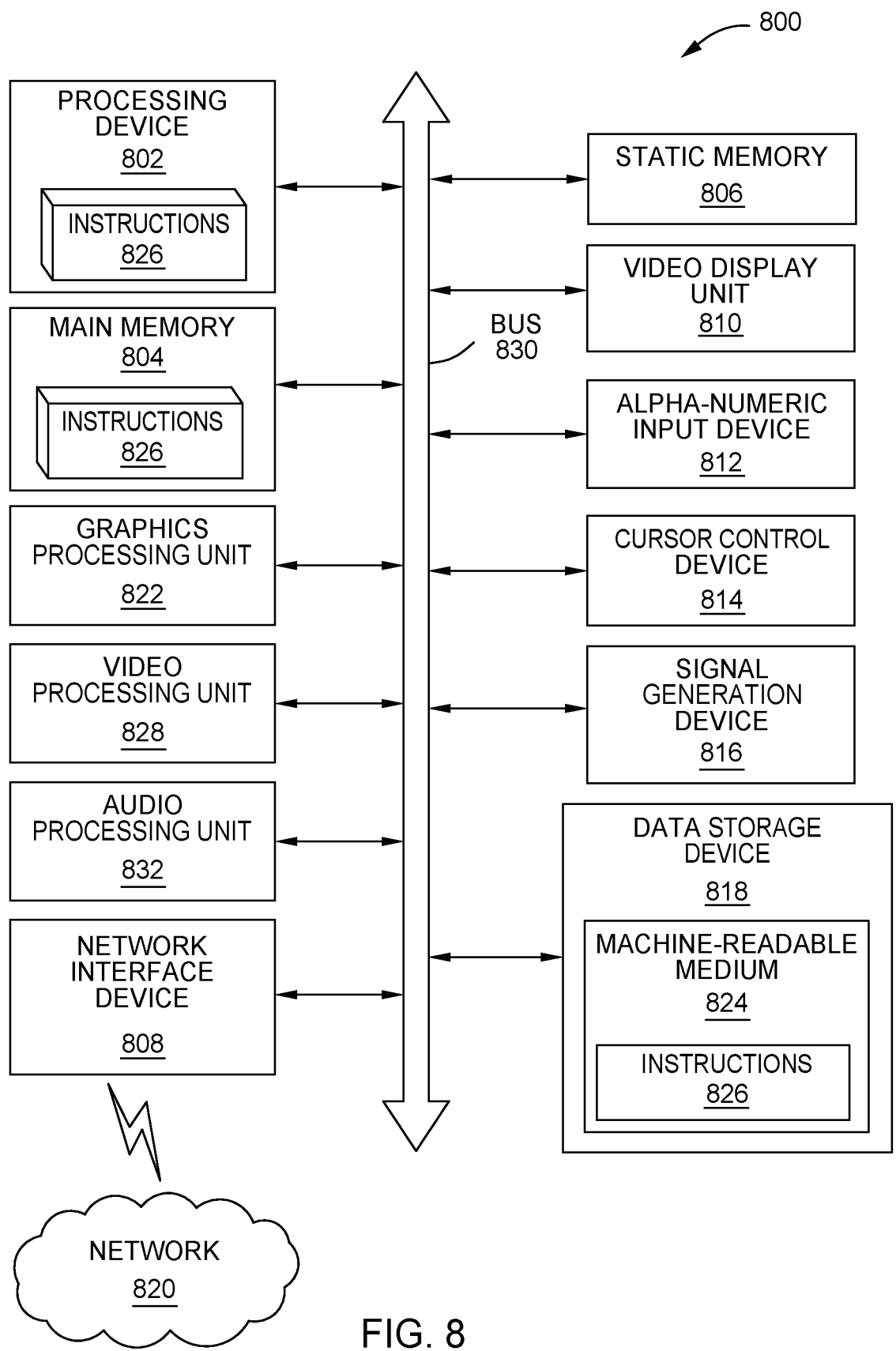
FIG. 8 depicts a diagram of an example computer system in which embodiments of the present disclosure may operate.

The clock tree engine 120 includes one or more processors (e.g., the processing device 802 of FIG. 8) that execute instructions (e.g., the instructions 826 of FIG. 8) stored in a memory (e.g., the memory 130, the main memory 804 and/or the machine-readable medium 824 of FIG. 8). The clock tree engine 120 updates one or more clock trees of the circuit design 132 to adjust the timings of the corresponding clock signals. In one example, the clock tree engine 120 generates an updated circuit design based on the updated clock trees and stores the updated circuit designs within the memory 130.

The memory 130 may be configured similar to that of the main memory 804 of FIG. 8 and/or the machine-readable medium 824 of FIG. 8. The memory 130 is accessible by the clock skew engine 110 and the clock tree engine 120. Further, the memory 130 stores the circuit design 132 and the updated circuit design (e.g., the updated circuit design 134).

Figure 2:
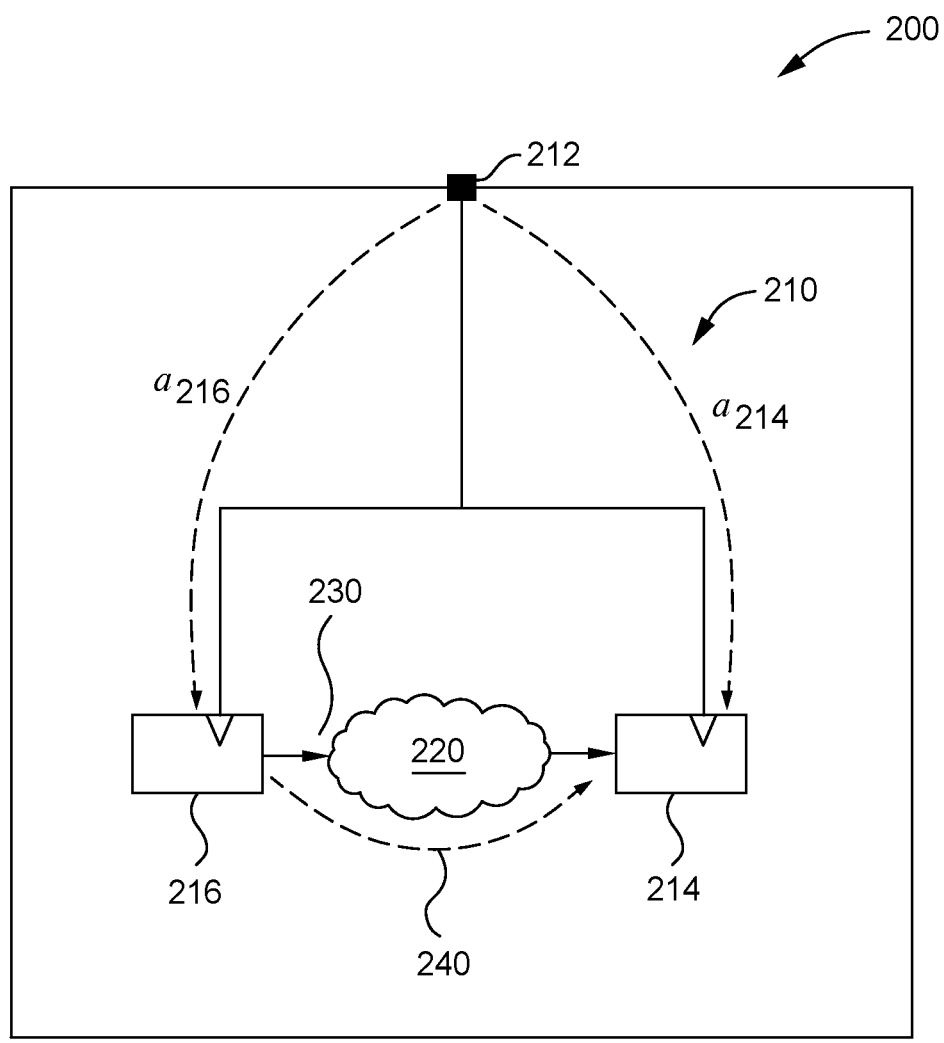
FIG. 2 illustrates an example circuit design, according to one or more examples.

FIG. 2 illustrates a portion of a circuit design 200. The circuit design 200 includes clock tree 210 and circuit logic 220. The clock tree 210 includes clock source 212 and clock sinks 214 and 216. Each of the clock sinks 214 and 216 are electrically coupled to the clock source 212. Further, the clock sink 214 is connected to the clock sink 216 via the circuit logic 220. In one example, clock arrival values (or times) $a_{214}$ and $a_{216}$ are the clock arrival values for the clock sink 214 and the clock sink 216, respectively. The clock arrival value $a_{214}$ corresponds to the amount of time that a clock signal takes to travel from the clock source 212 to the clock sink 214. The clock arrival value $a_{216}$ corresponds to the amount of time that a clock signal takes to travel from the clock source 212 to the clock sink 216. Local clock skew, clock skew, corresponds to a difference between the clock arrival values $a_{214}$ and $a_{216}$.

A path 230 through the circuit logic 220 connects the clock sink 216 to the clock sink 214. The path 230 is associated with a setup slack time (e.g., setup slack time 240). The setup slack time 240 corresponds to a difference between a required time for the path 230 and a measured arrival value (e.g., time) for the path 230. The arrival value corresponds to the amount of time that a signal takes to travel along the path. The arrival value may be determined using a static timing analysis (or another timing analysis) process.

Figure 3:
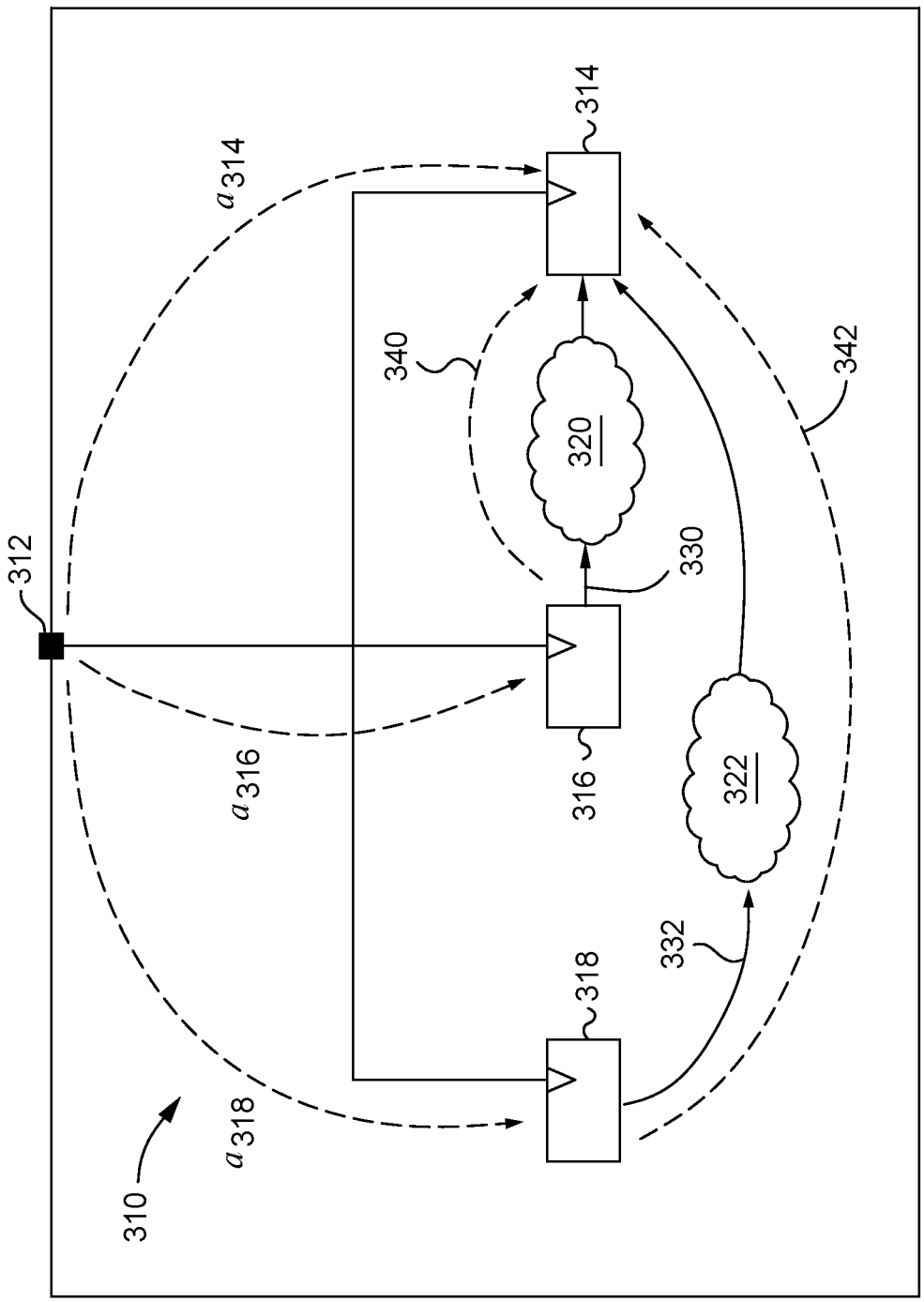
FIG. 3 illustrates an example circuit design, according to one or more examples.

FIG. 3 illustrates a portion of a circuit design 300. The circuit design 300 includes clock tree 310, circuit logic 320, and circuit logic 322. The clock tree 310 includes clock source 312 and clock sinks 314, 316, and 318. Each of the clock sinks 314, 316, and 318 are electrically coupled to the clock source 312. Further, the clock sink 316 is connected to the clock sink 314 via the circuit logic 320. The clock sink 318 is connected to the clock sink 314 via the circuit logic 322.

In one example, clock arrival values $a_{314}$, $a_{316}$, and $a_{318}$ are the clock arrival values for the clock sink 314, 316, and 318, respectively. The clock arrival value $a_{314}$ corresponds to the amount of time that a clock signal takes to travel from the clock source 312 to the clock sink 314. The clock arrival time $a_{316}$ corresponds to the amount of time that a clock signal takes to travel from the clock source 312 to the clock sink 316. The clock arrival time $a_{318}$ corresponds to the amount of time that a clock signal takes to travel from the clock source 312 to the clock sink 318. Local clock skew corresponds to a difference between the clock arrival values $a_{314}$ and $a_{316}$, $a_{314}$ and $a_{318}$, and $a_{316}$ and $a_{318}$.

A path 330 through the circuit logic 320 connects the clock sink 316 to the clock sink 314. The path 330 is associated with data path slack value 340. A path 332 through the circuit logic 322 connects the clock sink 318 to the clock sink 314. The path 330 is associated with data path slack value 342.

In one example, a clock tree has clock sinks $s_i$ and $s_j$. The clock arrival value at $s_i$ is $a_i$, and the clock arrival value at $s_j$ is $a_j$. The setup slack time is setup_slack$_{i,j}$. The setup local skew between the clock sinks $s_i$ and $s_j$ can be defined by Equation 1.

$$\text{setup\_local\_skew}_{i,j} = \max(\min(a_j - a_i, -\text{setup\_slack}_{i,j}), 0) \quad \text{Equation 1}$$

In Equation 1, $a_j - a_i$ is the clock arrival value difference of the clock sinks $s_i$ and $s_j$. The setup slack time is setup_slack$_{i,j}$ and corresponds to the local skew along a path between the clock sinks $s_i$ and $s_j$. To ensure that local skew between the clock sinks $s_i$ and $s_j$ is not over optimized, the setup slack time is used to determine the local skew between the clock sinks $s_i$ and $s_j$. Equation 1 models the timing of a clock tree to determine the skew that negatively affects (e.g., harmful skew) the performance of the corresponding circuit design.

Equation 2 is used to determine the slack timing associated with a hold timing path between the clock sinks $s_i$ and $s_j$. Hold timing corresponds to the minimum amount of time that a data input of a circuit element (e.g., clock sink) is held steady after a clock transition to ensure that the data is properly sampled by the circuit element.

$$\text{hold\_local\_skew}_{i,j} = \max(\min(a_i - a_j, -\text{hold\_slack}_{i,j}), 0) \quad \text{Equation 2}$$

In an example where a clock sink is connected to more than one clock sink via respective path, the combined, or total, setup local skew is determined for the clock sink. For example, with reference to FIG. 3, the clock sink 314 is connected to the clock sinks 316 and 318 via respective paths with respective slack (e.g., setup_slack) times. In one example, Equation 3 is used to determine a total setup local skew of the clock sinks within a clock tree. In Equation 3, the clock sink is $s_i$ and $C_i$ is the set of clock sinks that have a path ending at $s_i$. For the clock sink 314 of FIG. 3, the set $C_i$ includes clock sinks 316 and 318.

$$\text{total\_setup\_local\_skew}_i = \min_{s_j \in C_i}(\text{setup\_local\_skew}_{i,j}) \quad \text{Equation 3}$$

As is defined by Equation 3, the total setup local skew of a clock sink (e.g., clock sink $s_i$) is equal to the worst setup local skew among all the clock sinks having a path to the clock sink. The clock sinks having a path to the clock sink form local skew pairs with the clock sink. By substituting Equation 1 into Equation 3, Equation 4 is obtained.

$$\text{total\_setup\_local\_skew}_i = \min_{s_j \in C_i}(\max(\min(a_j - a_i, -\text{setup\_slack}_{i,j}), 0)) \quad \text{Equation 4}$$

As is described above with reference to FIG. 3 three clock sinks, clock sinks 314, 316, and 318 are depicted. The total setup local skew at clock sink 314 in view of Equation 4 is determined as shown in Equation 5.

$$\text{total\_setup\_local\_skew}_{314} = \min\begin{pmatrix} \max(\min(a_{316} - a_{314}, -\text{setup\_slack}_{314,316}), 0), \\ \max(\min(a_{318} - a_{314}, -\text{setup\_slack}_{314,318}), 0) \end{pmatrix} \quad \text{Equation 5}$$

In one example, the design total setup local skew is the sum of the setup local skew of all clock sinks within a circuit design. With reference to FIG. 3, the design total setup local skew is the combined setup local skew for the clock sinks 314, 316, and 318. Equation 6 can be used to determine the design total setup local skew for the clock sinks within a circuit design. In Equation 6, E is the set of all clock sinks in a circuit design.

$$\text{design\_total\_setup\_local\_skew} = \sum_{s_i \in E} \text{total\_setup\_local\_skew}(i) \quad \text{Equation 6}$$

Substituting Equation 5 into Equation 6 generates Equation 7. Equation 7 is used to determine how much skew contributes to timing violations within a circuit design. Timing violations occur within a circuit design when the execution time assigned to a path within the circuit design is shorter than actual execution time for the path. In one example, if a data path delay is too long, the data path delay is reported as a timing violation.

$$\text{design\_total\_setup\_local\_skew} = \sum_{s_i \in E}\left(\min_{s_j \in C_i}\left(\max\left(\min(a_j - a_i, -\text{setup\_slack}_{i,j}), 0\right)\right)\right) \quad \text{Equation 7}$$

Equation 8 defines the total hold local skew for a circuit design.

$$\text{design\_total\_hold\_local\_skew} = \sum_{s_i \in E}\left(\min_{s_j \in C_i}\left(\max\left(\min(a_i - a_j, \text{hold\_slack}_{i,j}), 0\right)\right)\right) \quad \text{Equation 8}$$

In one example, negative effects associated with the total setup local skew for a circuit design can be mitigated by changing clock arrival values at the clock sinks. In one example, the total local setup skew for a circuit design can be adjusted by inserting clock buffers and/or adjusting the size of a clock gate. Adjusting the size of a clock gate adjusts the period of the time during which a clock signal is gated. In one example, the clock arrival values are determined to mitigate the effects of the total setup local skew for a circuit design as is defined by Equation 7. Equation 7 defines the total local skew for a circuit design. The total setup local skew contains all of the setup slack timings between each pair of clock sinks (e.g., clock sink pairs) within a circuit design. For example, with reference to FIG. 7, Equation 7 can be used to determine the total setup local skew for clock sinks 314, 316, and 318.

In one example, a circuit design includes multiple pairs (e.g., tens, hundreds, thousands, or more) of clock sinks (e.g., clock sink pairs). Due to the number of pairs of clock sinks, a convex optimization problem using a logarithmic summation exponential approximation (LogSumExp) may be used to determine the total setup local skew of a circuit design with while uses less processor resources and processing time as compared to typical methods of determining total setup local skew. A LogSumExp approximation is a smooth approximation to a maximum function and utilizes a smoothing factor α. In one example, Equation 9 is a LogSumExp approximation used to approximate the total setup local skew of a circuit design.

$$\text{design\_total\_setup\_local\_skew} \approx \Sigma_{s_j \in E} \alpha \times (\log((\Sigma_{s_j \in C_j} e^{(a_j - a_i + \text{setup\_slack}_{i,j})/\alpha}) + e^0))$$ Equation 9

In Equation 9, α is a smoothing factor. The smaller the value of α, the closer the approximation of the total setup local skew for the circuit design is to the non-approximated total setup local skew for the circuit design. Equation 9 is convex and continuously differentiable. Convexity is a property that makes the solving of Equation 9 more tractable. Further, the continuity and differentiability of Equation 9 allow Equation 9 to be iteratively solved using various gradient descent solver methods efficiently. In one example, a conjugate gradient solver is applied to iteratively solve Equation 9. The solver iteratively solves Equation 9 by computing gradient values at various trial solutions and moving in the direction of the negative gradient. In one or more examples, Equation 9 can be used to adjust a clock tree (e.g., the clock tree 210 of FIG. 2 and/or the clock tree 310 of FIG. 3) of a circuit design (e.g., the circuit design 200 of FIG. 2 and/or the circuit design 300 of FIG. 3) to improve the performance of the circuit design by mitigating setup local skew.

Figure 4:
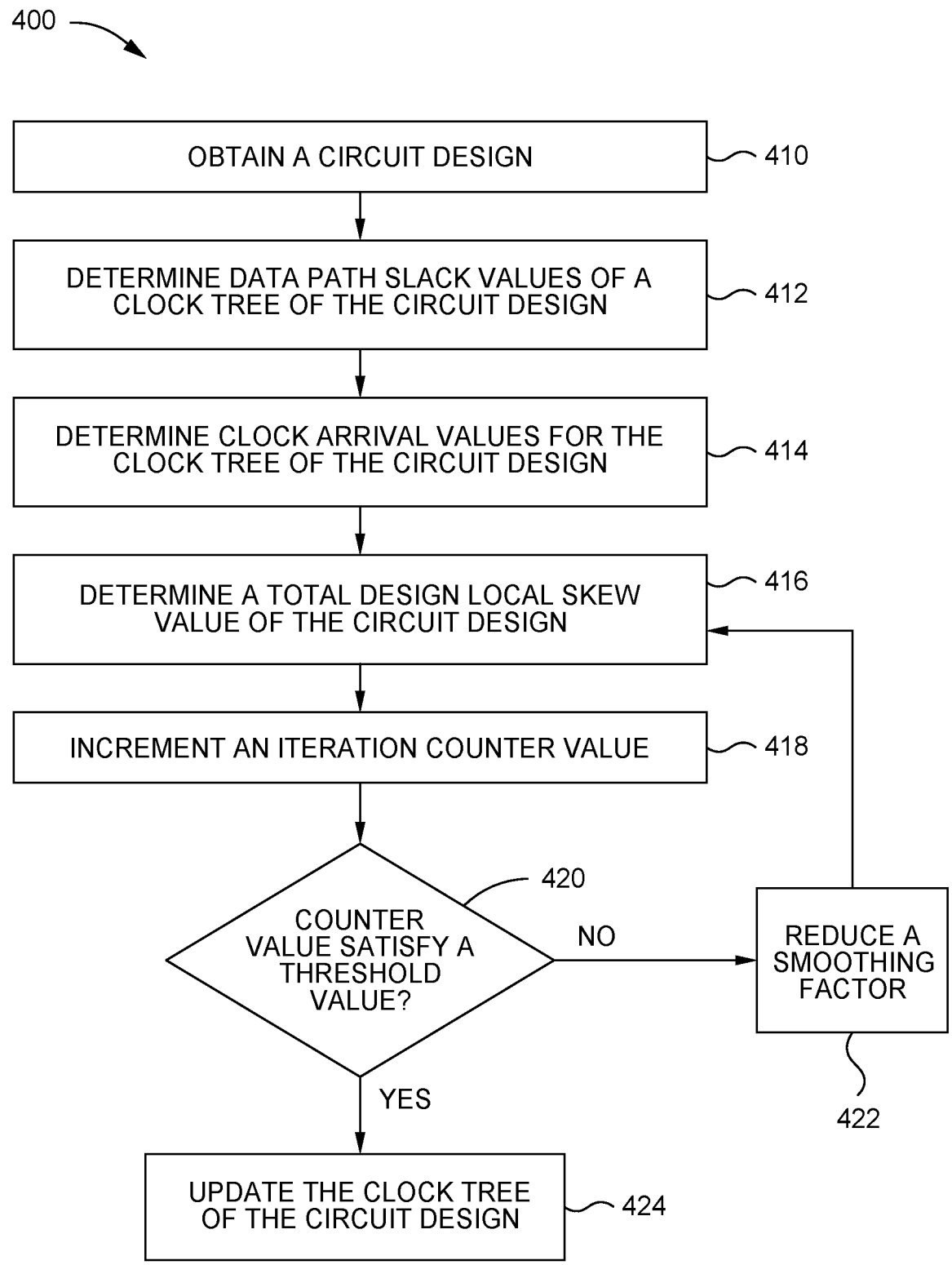
FIG. 4 illustrates a flowchart of a method for improving the performance of a circuit design, according to one or more examples.

FIG. 4 depicts a flowchart of a method 400 for adjusting a clock tree of a circuit design (e.g., the circuit design 132) to mitigate setup local skew. The method 400 is performed by one or processors of the circuit design system 100 by executing instructions stored within a memory. In one example, at 410 of the method 400, the circuit design 410 is obtained from the memory 130 by the clock skew engine 110. For example, one or more processors of the clock skew engine 110 executes instructions stored within a memory to obtain the circuit design 132 from the memory 130. In one example, the clock skew engine 110 obtains the circuit design 132 from a system external to the circuit design system 100 or another engine within the circuit design system 100. In one example, the method 400 may be used as part of synthesis and design for test 718 of FIG. 7.

At 412 of the method 400, the clock skew engine 110 determines data path slack values of a clock tree of the circuit design 132. The data path slack values are the setup_slack$_{i,j}$ values. In one example, with reference to FIG. 3, the clock skew engine 110 determines the data path slack value (e.g., setup slack time) 340 and data path slack value (setup slack time) 342. In one example, the clock skew engine 110 traces the path 330 (e.g., timing paths) between the clock sinks 316 and 314 and through the circuit logic 320, and the path 332 between the clock sinks 318 and 314 and through the circuit logic 322. By tracing the paths, the clock skew engine 110 determines the data path slack value 340 from the path 330 and the data path slack value 342 from the path 332. In one example, the data path slack value 340 is determined by determining a difference between a measured timing of the path 330 compared to the design timing of the path 330. The design timing of the path 330 is the timing of the path 330 provided by the circuit design 132. The data path slack value 340 can be a positive or negative value. The timing of the path 332 is determined by performing a static timing analysis of the path 332. In one example, the data path slack value 342 is determined by determining a difference between a measured timing of the path 332 compared to the design timing of the path 332. The data path slack value 340 can be a positive or negative value. In one example, the timing of the path 332 is determined by performing a static timing analysis of the path 332.

At 414 of the method, the clock skew engine 110 determines the initial (or starting) clock arrival values for the clock tree (or trees) of the circuit design 132. The clock skew engine 110 determines the clock arrival values for a clock tree by traversing the clock tree from the clock source or sources 312 to each of the associated clock sinks. This process is performed for each clock tree in the circuit design 132. In one example, the clock arrival values are determined by performing a static timing analysis. A clock arrival value corresponds to the amount of time a signal (e.g., a clock signal) takes to travel from a clock source (e.g., the clock source 212 of FIG. 2 or the clock source 312 of FIG. 3) to a clock sink (e.g., the clock sink 214 and/or 216 of FIG. 2 or the clock sink 314, 316, and/or 318 of FIG. 3). In one example, to determine the clock arrival value, delay of any circuit components (e.g., buffers, clock gates, and/or wires, among others) between the clock source and a clock sink is determined. With reference to FIG. 3, the clock skew engine 110 determines the clock arrival values for the clock tree 310. The clock skew engine 110 determines the clock arrival values for the clock tree 310 by traversing the clock tree 310 starting at the clock source 312 to each of the clock sinks 314, 316, and 318. Static timing analysis, or another timing analysis process, is used to determine the clock arrival values $a_{314}$, $a_{2316}$, and $a_{318}$ between the clock source 312 and the clock sinks 314, 316, and 318 of the clock tree 310.

At 416 of the method 400, the clock skew engine 110 determines the total design setup local skew of the circuit design 132. In one example, the total design setup local skew is determined using Equation 9 based on the data path slack values and the clock arrival values determined at 412 and 414 of the method 400. In one example, a gradient decent solver is used to determine the total design setup local skew by iteratively solving Equation 9 with clock arrival times being the variables (e.g., $a_i$ and $a_j$ in Equation 9). In one example, the soothing factor α is set to a value of 1 when iteratively solving Equation 9 with the data path slack values and the initial clock arrival values determined at 412 and 414 of the method 400.

In one example, determining the total design local skew of the circuit design determines clock arrival target values for each of the clock sinks within the circuit design (e.g., the circuit design 132). With reference to FIG. 4, determining the total design local skew of the circuit design 300 determines clock arrival target values for each of the clock sinks 314, 316, and 318. The clock arrival target values are stored within the memory 130.

At 418 of the method 400, the clock skew engine 110 increments a counter value. The counter value is stored within the memory 130. In one example, the clock skew engine 110 increments the counter value by one. Further, the clock skew engine 110 initializes the counter value to an initialization value (e.g., a value of zero) before incrementing the counter value.

At 420, the clock skew engine 110 determines whether or not the counter value satisfies a threshold value is determined. In one example, the clock skew engine 110 determines if the counter value is less than the threshold value. In another example, the clock skew engine 110 determines if the counter value is less than or equal to the threshold value. The threshold value is one or more. In example, the threshold value is five, ten, or greater than ten. The threshold value may correspond to the available processing resources and/or processing time to perform the method 400. For example, higher threshold values correspond to more processing resources and/or processing time as compared to lower threshold values.

Based on the determination that the counter value does not satisfy the threshold value at 420 of the method 400, the clock skew engine 110 reduces the value of the smoothing factor at 422 of the method 400. For example, the clock skew engine 110 reduces the value of the smoothing factor by fifty percent. In other examples, the clock skew engine 110 reduces the value of the smoothing factor by less than or greater than fifty percent. Further, during each interaction of 422 of the method 400, the clock skew engine 110 reduces the value of the smooth factor by the same amount or by different amounts. The method 400 proceeds to the 416 of the method 400 after reducing the smoothing factor at 422. The total design local skew of the circuit design 132 is determined based on the reduced smoothing factor determined at 422.

Figure 5:
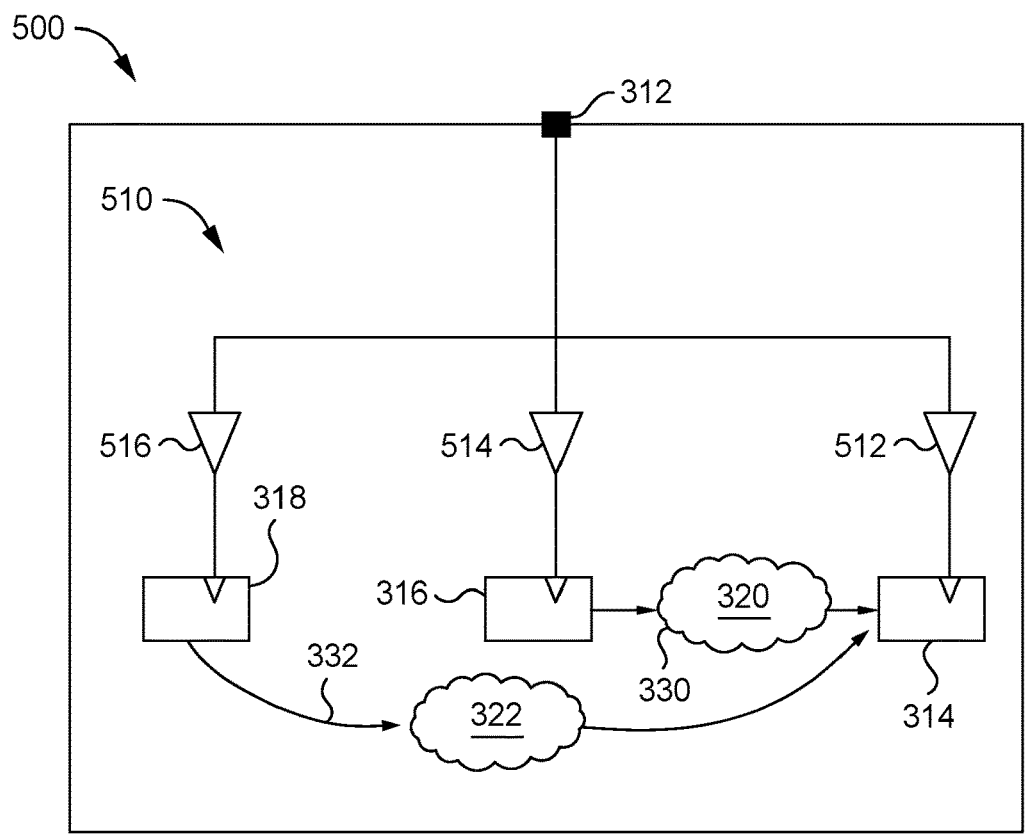
FIG. 5 illustrates an example circuit design generated by the method of FIG. 4.

Based on the determination that the count value does satisfy the threshold value, the clock tree engine 120 updates the clock tree of the circuit design 132 at 424 of the method 400. Updating the clock tree includes implementing the target arrival times determined from the total design local skew of the circuit design 132 determined at 416. In one or more examples, if the target arrival time is larger than initial arrival time, buffer insertion in conjunction with clock gate sizing (e.g. sizing down) are used to implement the target arrival time. Further, if target arrival time is smaller than initial arrival time, clock gate sizing (e.g. sizing up) is used to implement the target arrival time. In one example, with reference to FIG. 3, one or more buffers are added to the clock tree 310 based on the target arrival values for one or more of the clock sinks 314, 316, and 318. For example, a buffer may be inserted between the clock source 312 and the clock sink 314 to generate the target arrival value for the clock sink 314. A buffer may be inserted between the clock source 312 and the clock sink 316 to generate the target arrival value for the clock sink 316. A buffer may be inserted between the clock source 312 and the clock sink 318 to generate the target arrival value for the clock sink 318. FIG. 5 illustrates a circuit design 500. The circuit design 500 is configured similar to that of the circuit design 300 of FIG. 3. For example, the circuit design 500 and the circuit design 300 include the clock source 312, the clock sinks 314, 316, and 318 the circuit logic 320 and 322. The clock tree 510 of the circuit design 500 includes the buffers 512, 514, and 516 between the clock source 312 and the clock sinks 314, 316, and 318, while the clock tree 310 of the circuit design 300 does not include the buffers 512, 514, and 516. The buffers 512, 514, and 516 are inserted to generate the target arrival value for the clock sink 314, the clock sink 316, and the clock sink 318, respectively. The number of buffers between the clock source 312 and each of the clock sinks 314, 316, and 318 corresponds to the respective target arrival values for each of the clock sinks 314, 316, and 318. In one or more examples, more than one buffer may be disposed between the clock source 312 and the clock sink 314, the clock sink 316, and the clock sink 318. The number of buffers between the clock source 312 and the clock sink 314, between the clock source 312 and the clock sink 316, and between the clock source 312 and the clock sink 318 differ from each other to generate the respective target arrival times. Further, the number of buffers between at least two of the clock source 312 and the clock sink 314, between the clock source 312 and the clock sink 316, and between the clock source 312 and the clock sink 318 differ from each other to generate the respective target arrival times is the same.

Figure 6:
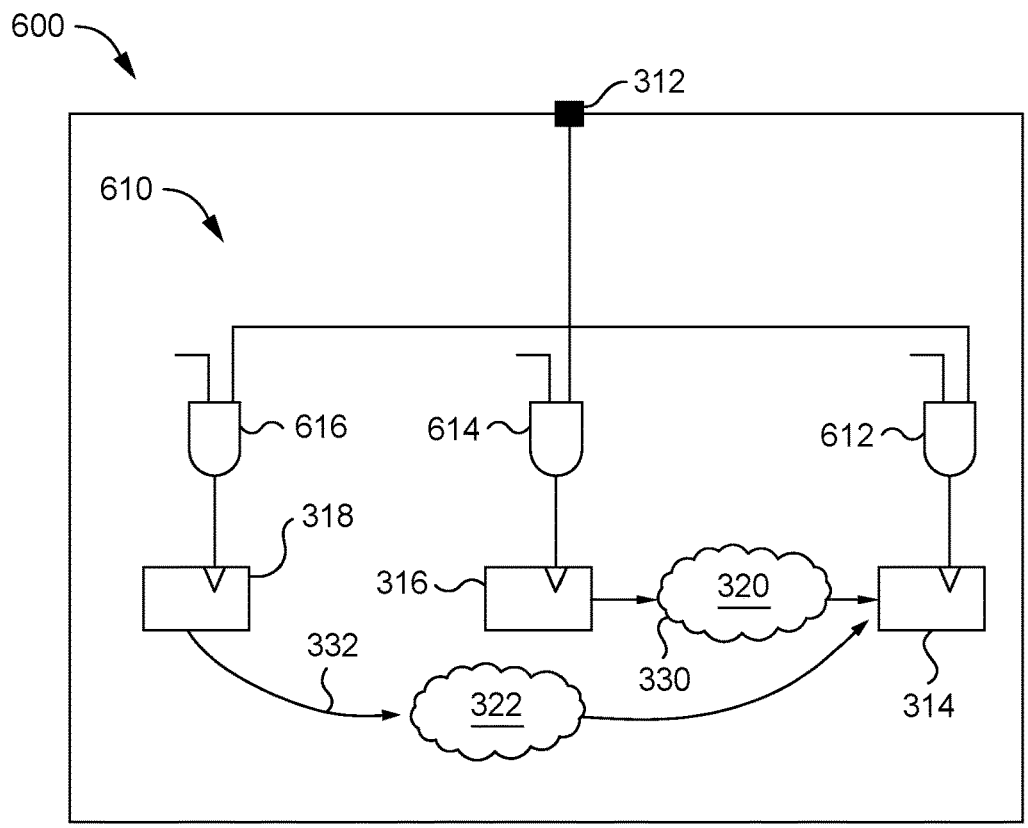
FIG. 6 illustrates an example circuit design generated by the method of FIG. 4.

In one or more example, the clock gate sizing of the clock tree 310 are adjusted based on the target arrival values of the clock sinks 314, 316, and 318. The clock gate sizing corresponds to a clock gating threshold used to determine whether or not to implement clock gating. For example, the clock gating threshold of the clock tree 310 may be increased or decreased based on the target arrival values of the clock sinks 314, 316, and 318. FIG. 6 illustrates the circuit design 600. The circuit design 600 is configured similar to that of the circuit design 300 of FIG. 3. For example, the circuit design 600 and the circuit design 300 includes the clock source 312, the clock sinks 314, 316, and 318, and the circuit logic 320 and 322. The circuit design 600, and the clock tree 610 of the circuit design 600, further includes logic gates 612, 614, and 616. The logic gates 612, 614, and 616 may be AND gates. In other examples, other types of logic gates may be used. The logic gate 612 is disposed between the clock source 312 and the clock sink 314, the logic gate 614 is disposed between the clock source 312 and the clock sink 316, and the logic gate 616 is disposed between the clock source 312 and the clock sink 318. In one or more examples, a different number of logic gates may be used than that of the example of FIG. 6. For example, one or more of the logic gates 612, 614, and 616 may be omitted depending on the target arrival values of the clock sinks 314, 316, and 318.

In one example, a clock tree may include a combination of buffers and logic gates. For example, one or more buffers and one or more logic gates may be disposed between a clock source and a clock sink of a clock tree based on the corresponding target arrival values. Further, a buffer is disposed between a clock source and a first clock sink of a clock tree and a logic gate is disposed between the clock source and a second clock sink of the clock tree.

The updated clock tree (e.g., the clock tree 510 of FIG. 5 and/or 610 of FIG. 6) is saved within an updated circuit design (e.g., the updated circuit design 134 of FIG. 1) within the memory 130. In one or more examples, the updated circuit design 134 is output to another system or another engine within the circuit design system 100. In one example, updating the circuit design 132 to generate the updated circuit design 134 includes generates an updated netlist file for the updated circuit design 134.

Figure 7:
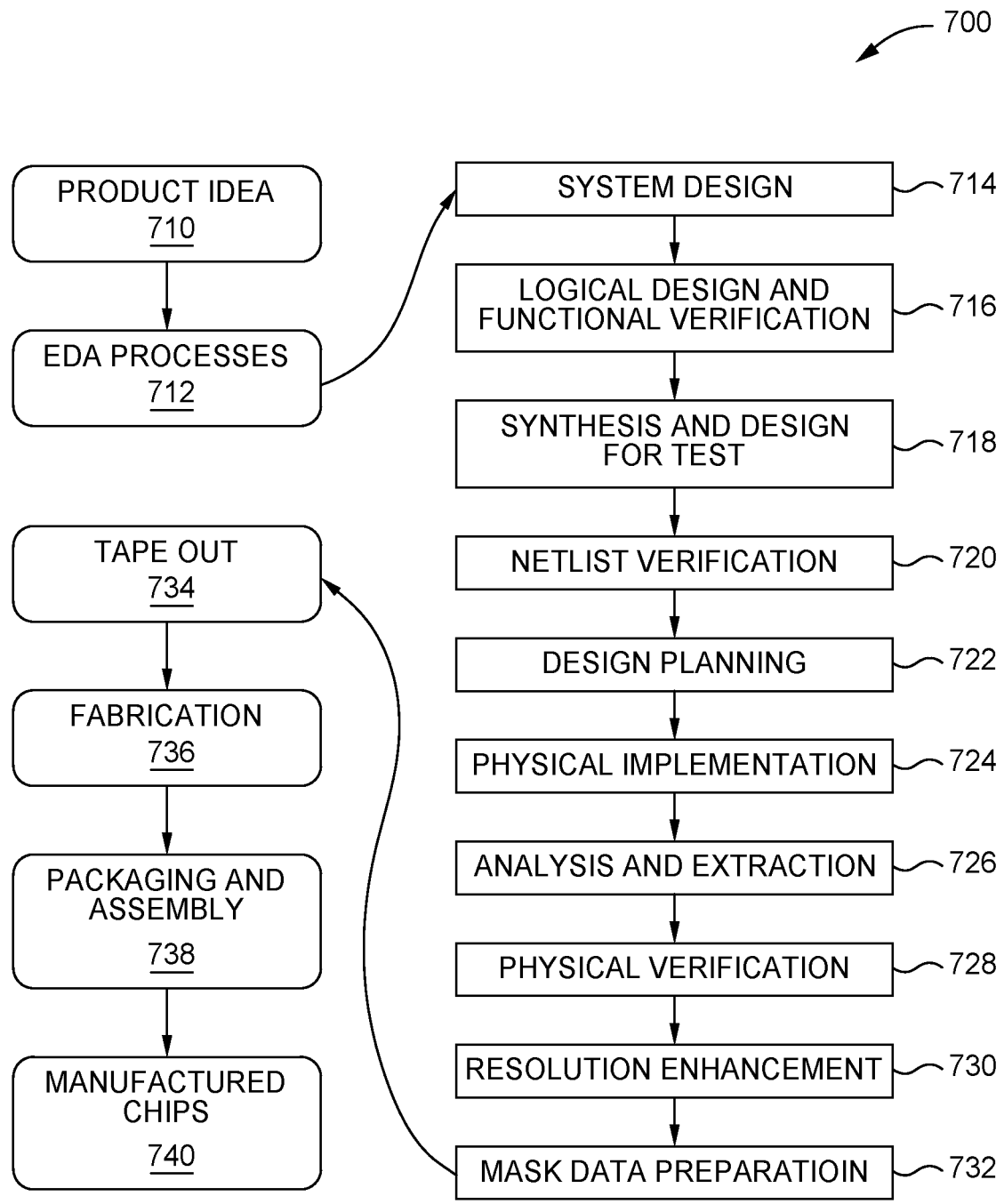
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information that is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining a circuit design including circuit elements and a clock tree, the clock tree including clock sources and clock sinks;
   determining data path slack values for the clock tree based on the clock sources and the clock sinks;
   determining clock arrival values for the clock tree based on the clock sources and the clock sinks;
   determining, by a processing device, a first total local skew value of the circuit design based on the data path slack values, and the clock arrival values; and
   updating the clock tree based on the first total local skew value.

2. The method of claim 1, wherein determining the data path slack values comprises determining a data path slack value for each clock source and clock sink pair, wherein each clock source and clock sink pair includes a clock source of the clock sources and a clock sink of the clock sinks.

3. The method of claim 2, wherein determining the data path slack value for each clock source and clock sink pair comprises tracing a timing path between the clock source and the clock sink in each clock source and clock sink pair.

4. The method of claim 1, wherein determining the clock arrival values includes traversing the clock tree from each of the clock sources to each of the clock sinks.

5. The method of claim 1, wherein the first total local skew value of the circuit design is further based on a smoothing factor.

6. The method of claim 5, further comprising:
reducing the smoothing factor to generate a reduced smoothing factor; and
determining a second total local skew value of the circuit design based on the reduced smoothing factor.

7. The method of claim 1, wherein updating the clock tree based on the first total local skew value comprises at least one of:
inserting one or more buffers within the clock tree based on the first total local skew value; or
adjusting a gate size of the circuit design based on the first total local skew value.

8. A system comprising:
a memory storing instructions; and
a processor, coupled with the memory and configured to execute the instructions, the instructions when executed cause the processor to:
obtain a circuit design including circuit elements and a clock tree, the clock tree including clock sources and clock sinks;
determine data path slack values for the clock tree based on the clock sources and the clock sinks;
determine clock arrival values for the clock tree based on the clock sources and the clock sinks;
determine a first total local skew value of the circuit design based on the data path slack values, and the clock arrival values; and
update the clock tree based on the first total local skew value.

9. The system of claim 8, wherein determining the data path slack values comprises determining a data path slack value of the data path slack values for each clock source and clock sink pair, wherein each clock source and clock sink pair includes a clock source of the clock sources and a clock sink of the clock sinks.

10. The system of claim 9, wherein determining the data path slack value for each clock source and clock sink pair comprises tracing a timing path between the clock source and clock sink in each clock source and clock sink pair.

11. The system of claim 8, wherein determining the clock arrival values includes traversing the clock tree from each of the clock sources to each of the clock sinks.

12. The system of claim 8, wherein the first total local skew value of the circuit design is further based on a smoothing factor.

13. The system of claim 12, wherein the processor is further caused to:
reduce the smoothing factor to generate a reduced smoothing factor; and
determine a second total local skew value of the circuit design based on the reduced smoothing factor.

14. The system of claim 8, wherein updating the clock tree based on the first total local skew value comprises at least one of:
inserting one or more buffers within the circuit design based on the first total local skew value; or
adjusting a gate size of the circuit design based on the first total local skew value.

15. A non-transitory computer readable medium comprising stored instructions, which when executed by a processor, cause the processor to:
obtain a circuit design including circuit elements and a clock tree, the clock tree including clock sources and clock sinks;
determine data path slack values for the clock tree based on the clock sources and the clock sinks;
determine clock arrival values for the clock tree based on the clock sources and the clock sinks; and
update the clock tree by adjusting timings within the clock tree based on the data path slack values and the clock arrival values.

16. The non-transitory computer readable medium of claim 15, wherein the processor is further caused to determine a first total local skew value of the circuit design based on the data path slack values, the clock arrival values, and a smoothing factor, wherein the adjusting the timings within the clock tree is based on the first total local skew value.

17. The non-transitory computer readable medium of claim 16, wherein the processor is further caused to:
reduce the smoothing factor to generate a reduced smoothing factor; and
determine a second total local skew value of the circuit design based on the reduced smoothing factor.

18. The non-transitory computer readable medium of claim 15, wherein determining the data path slack values comprises determining a data path slack value for each clock source and clock sink pair by tracing a timing path between the clock source and clock sink in each clock source and clock sink pair, wherein each clock source and clock sink pair includes one of the clock sources and one of the clock sinks.

19. The non-transitory computer readable medium of claim 15, wherein determining the clock arrival values includes traversing the clock tree from each of the clock sources to each of the clock sinks.

20. The non-transitory computer readable medium of claim 15, wherein updating the clock tree comprises at least one of:
inserting one or more buffers within the circuit design based on the data path slack values and the clock arrival values; or
adjusting a gate size of the circuit design based on the data path slack values and the clock arrival values.

* * * * *